US010968828B2

(12) United States Patent
Merchant (10) Patent No.: US 10,968,828 B2
(45) Date of Patent: Apr. 6, 2021

(54) ANTI-ICING SYSTEM FOR A GAS TURBINE

(71) Applicant: General Electric Company, Schenectady, NY (US)

(72) Inventor: Laxmikant Merchant, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 89 days.

(21) Appl. No.: 16/294,621

(22) Filed: Mar. 6, 2019

(65) Prior Publication Data

US 2020/0284193 A1    Sep. 10, 2020

(51) Int. Cl.
| | |
|---|---|
| *F02C 7/047* | (2006.01) |
| *F01D 25/02* | (2006.01) |
| *F01D 11/24* | (2006.01) |
| *B64D 33/02* | (2006.01) |

(52) U.S. Cl.
CPC .............. *F02C 7/047* (2013.01); *F01D 11/24* (2013.01); *F01D 25/02* (2013.01); *B64D 2033/0233* (2013.01); *F05D 2220/32* (2013.01)

(58) Field of Classification Search
CPC .......... F01D 11/24; F01D 25/02; F02C 7/047; B64D 2033/0233; F05D 2220/32
See application file for complete search history.

(56) References Cited

U.S. PATENT DOCUMENTS

| | | | |
|---|---|---|---|
| 4,821,961 A | 4/1989 | Shook | |
| 5,316,218 A | 5/1994 | Bowen | |
| 5,560,195 A * | 10/1996 | Anderson | F02C 7/04 417/80 |
| 6,267,328 B1 * | 7/2001 | Vest | B64D 15/04 239/599 |
| 6,354,538 B1 | 3/2002 | Chilukuri | |
| 8,272,222 B2 * | 9/2012 | Zhang | F02K 1/46 60/785 |
| 8,499,409 B2 | 8/2013 | Reining | |
| 8,864,913 B2 | 10/2014 | Haynam et al. | |
| 9,447,732 B2 * | 9/2016 | Mazumder | F04D 27/0207 |
| 9,770,684 B1 | 9/2017 | Kelyman | |
| 9,815,558 B2 * | 11/2017 | Saeed | B64D 15/04 |
| 10,393,020 B2 * | 8/2019 | Frank | B64D 33/02 |
| 10,704,464 B2 * | 7/2020 | Saraswathi | F02C 6/08 |
| 2013/0115114 A1 | 5/2013 | Bryant et al. | |
| 2014/0260992 A1 | 9/2014 | Fernaays et al. | |
| 2015/0219047 A1 | 8/2015 | Peterson | |
| 2017/0057643 A1 | 3/2017 | Frank et al. | |
| 2020/0032709 A1 * | 1/2020 | Chilukuri | B64D 15/04 |

FOREIGN PATENT DOCUMENTS

| | | |
|---|---|---|
| DE | 4009552 A1 | 9/1991 |
| EP | 3269440 A1 | 1/2018 |
| JP | 2016034628 B2 | 3/2016 |

* cited by examiner

*Primary Examiner* — Brian P Wolcott
(74) *Attorney, Agent, or Firm* — Fletcher Yoder, P.C.

(57) ABSTRACT

An anti-icing system for a gas turbine system includes multiple nozzles arranged in a grid and configured to inject fluid within an air intake system of the gas turbine system upstream of a filter to keep ice from forming on the filter. Each nozzle of the multiple nozzles includes multiple orifices for injecting the fluid via jets. The anti-icing system also includes a nozzle head coupled to a nozzle of the multiple nozzles. The nozzle head is disposed over the multiple orifices and is configured to rotate relative to the nozzle. The nozzle head includes at least one outlet for injecting the fluid from the jets via at least one jet.

20 Claims, 6 Drawing Sheets

ANTI-ICING SYSTEM FOR A GAS TURBINE

BACKGROUND

The subject matter disclosed herein relates to an anti-icing system for gas turbine engines.

In general, gas turbine engines combust a mixture of compressed air and fuel to produce hot combustion gases. The combustion gases may flow through a turbine to generate power for a load and/or a compressor. In inclement conditions, ice buildup may occur that adversely affects a filtration system located within a gas turbine air intake upstream of the compressor. The ice buildup may result in excessive pressure loss within the gas turbine system, thus, impacting system performance.

BRIEF DESCRIPTION

In one embodiment, an anti-icing system for a gas turbine system includes multiple nozzles arranged in a grid and configured to inject fluid within an air intake system of the gas turbine system upstream of a filter to keep ice from forming on the filter. Each nozzle of the multiple nozzles includes multiple orifices for injecting the fluid via jets. The anti-icing system also includes a nozzle head coupled to a nozzle of the multiple nozzles. The nozzle head is disposed over the multiple orifices and is configured to rotate relative to the nozzle. The nozzle head includes at least one outlet for injecting the fluid from the jets via at least one jet.

In another embodiment, a gas turbine system includes a turbine, a combustor, and a compressor having an air intake. The air intake is configured to supply an air flow to the compressor, and the air intake includes a filter system and an anti-icing system. The anti-icing system includes a nozzle having multiple orifices for directing jets of fluid from the nozzle. The anti-icing system further includes a nozzle head coupled to the nozzle. The nozzle head is disposed over the multiple orifices and is configured to rotate relative to the nozzle. The nozzle head includes at least one outlet and is configured to combine the jets of fluid into at least one jet that exits the at least one outlet into the air intake upstream of the filter system to keep ice from forming on the filter system.

In a further embodiment, a nozzle head for an anti-icing system includes a stationary portion configured to couple to a nozzle. The nozzle has multiple orifices for directing jets of fluid into an air intake system of a gas turbine system. The nozzle head further includes a rotating portion coupled to the stationary portion. The stationary portion and the rotating portion together enclose the multiple orifices. The rotating portion includes a single outlet configured to combine the jets of fluid into a single jet of fluid that exits into the air intake system. An eccentric jet angular momentum of the single jet of fluid is configured to drive rotation of the rotating portion relative to the stationary portion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include an anti-icing system for minimizing and/or blocking a buildup of ice on a filter within an air intake that directs air flow to a compressor of a gas turbine system. In some situations, the gas turbine system operates under cold and/or high relative humidity conditions that may cause ice to buildup in the interior of the air intake for the gas turbine system. In order to avoid the buildup of ice within the gas turbine system, some gas turbine systems include anti-icing systems having nozzles configured to spray a fluid at certain locations within the gas turbine system. The fluid may increase a local ambient temperature of a region adjacent the filter in an effort to avoid the buildup of ice on the region adjacent the filter. However, traditional anti-icing systems may unevenly heat a filter leaving cold spots where ice may still buildup and cause pressure losses in the air intake system. In the disclosed embodiment, the anti-icing system includes nozzle heads configured to mount to the nozzles to increase heating coverage for each nozzle, which will reduce and/or avoid cold spots adjacent the filter such that the disclosed anti-icing system may more effectively remove, reduce, and/or block the buildup of ice from forming on the filter.

Figure 1:
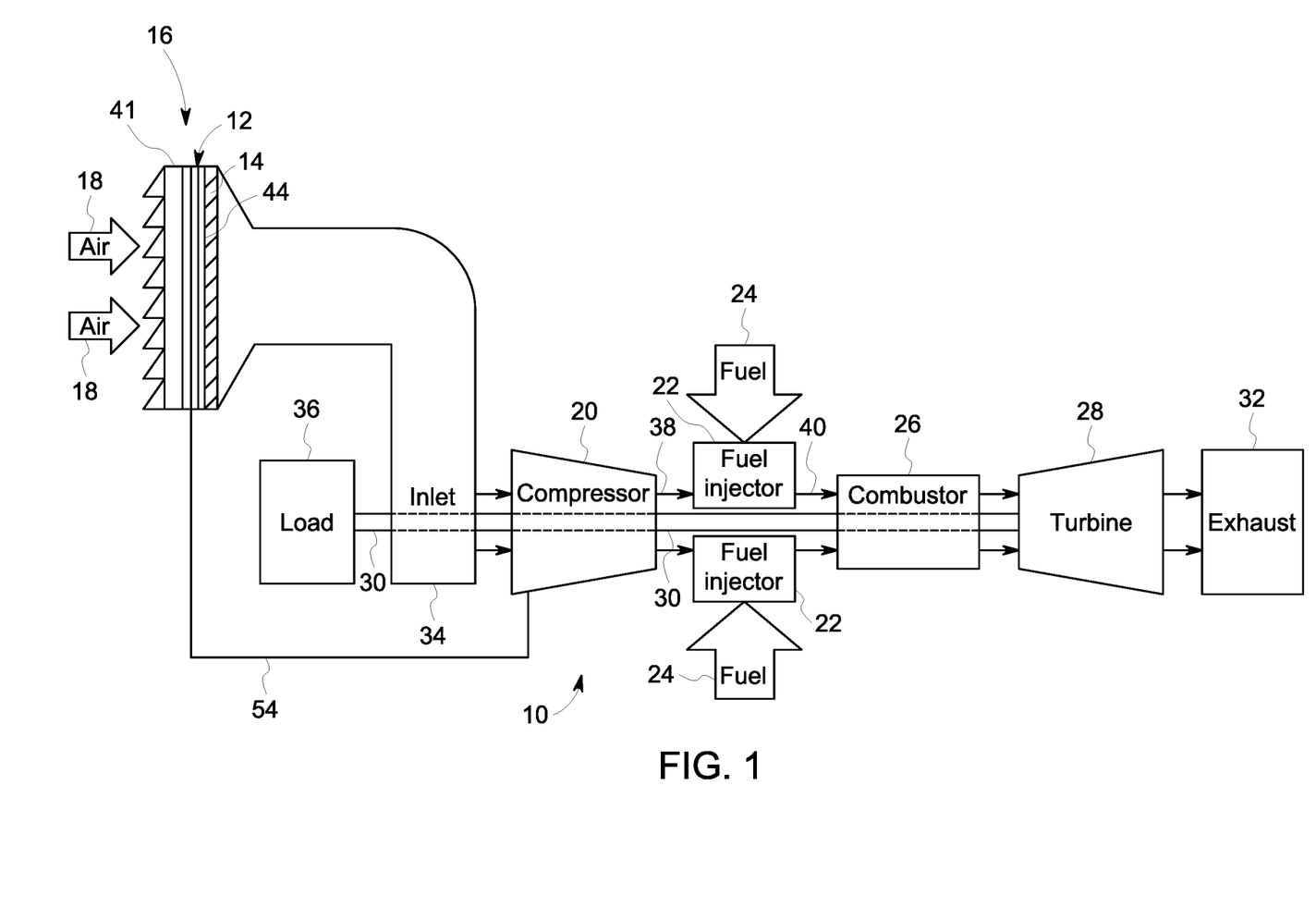
FIG. 1 is block diagram of an embodiment of a gas turbine system.

Turning now to the drawings, FIG. 1 is a block diagram of a gas turbine system 10 including an anti-icing system 12 configured to keep ice from forming on a filter 14 within an air intake system 16 that directs air flow 18 to a compressor 20 of the gas turbine system 10. The gas turbine system 10 is described below for the purpose of providing context for embodiments of the present anti-icing system 12. It should be appreciated that the anti-icing system 12 described below may be utilized for keeping ice from forming on filters 14 within air intake systems 16 that direct air flow 18 to other compressors 20, such as those used in air separation plants, blast furnaces, or other applications employing compressed air.

In the present embodiment, the gas turbine system 10 (e.g., gas turbine engine) includes a fuel injector 22, a fuel supply 24, and a combustor 26. As illustrated, the fuel supply 24 routes a liquid fuel and/or gas fuel, such as natural gas, to the gas turbine system 10 through the fuel injector 22 into the combustor 26. As discussed below, the fuel injector 22 is configured to inject and mix the fuel with compressed air. The combustor 26 ignites and combusts the fuel-air mixture, and then passes hot pressurized exhaust gas into a turbine 28. As will be appreciated, the turbine 28 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 30 will cause the rotation of the shaft 30, which is also coupled to several components throughout the gas turbine system 10, as illustrated. Eventually, the exhaust of the combustion process may exit the gas turbine system 10 via an exhaust outlet 32.

The compressor 20 includes blades rigidly mounted to a rotor which is driven to rotate by the shaft 30. As air passes through the rotating blades, air pressure increases, thereby providing the combustor 26 with sufficient air for proper combustion. The compressor 20 may intake air to the gas turbine system 10 via an inlet 34 (e.g., turbine air intake or turbine compressor intake). Further, the shaft 30 may be coupled to a load 36, which may be powered via rotation of the shaft 30. As will be appreciated, the load 36 may be any suitable device that may use the power of the rotational output of the gas turbine system 10, such as a power generation plant or an external mechanical load. For example, the load 36 may include an electrical generator. The inlet 34 draws air 18 into the gas turbine system 10. The air 18 then flows through blades of the compressor 20, which provides compressed air 38 to the combustor 26. In particular, the fuel injector 22 may inject the compressed air 38 and fuel 24, as a fuel-air mixture 40, into the combustor 26. Alternatively, the compressed air 38 and fuel 24 may be injected directly into the combustor 26 for mixing and combustion.

As illustrated, the turbine system 10 includes the anti-icing system 12 configured to keep ice from forming on the filters 14 within the air intake system 16 that directs air flow 18 to the compressor 20 of the gas turbine system 10. In the present embodiment, the anti-icing system 12 includes a plurality of nozzles disposed upstream of a filter system 44 in an array of grids 41. The filter system 44 includes the filter 14. In some embodiments, the filter system 44 includes a plurality of filters. Further, a plurality nozzle heads are configured to attach to respective nozzles of the plurality of nozzles. The nozzle heads may emit a fluid to heat portions of the filter 14 of the filter system 44. In some embodiments, the fluid is compressor discharge air from the compressor 20. A compressor discharge line 54 may route the fluid (e.g., compressor discharge air) to the anti-icing system 12. The fluid may be hotter than an ambient temperature within the air intake system 16, such that the fluid (e.g., compressor discharge air) emitted from the anti-icing system 12 warms portions of the filter 14 to remove, reduce, or block ice buildup on the filter 14.

Figure 2:
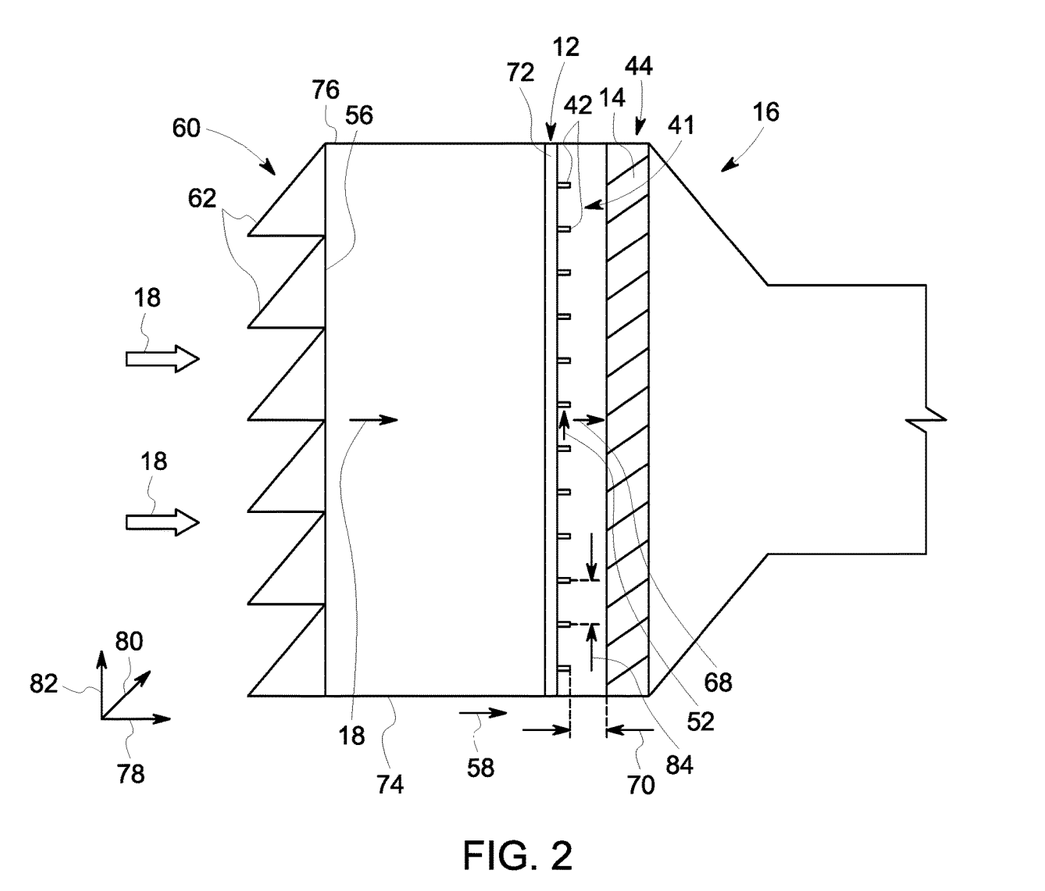
FIG. 2 is a schematic of an embodiment of a turbine air intake of the gas turbine system of FIG. 1.

FIG. 2 is a schematic of an embodiment of the air intake system 16 configured to provide the air flow 18 to the compressor 20 of FIG. 1. As illustrated, the air 18 enters an air inlet 56 of the air intake system 16 and flows toward the compressor 20 along a downstream direction 58. In the present embodiment, the air 18 enters the air inlet 56 of the air intake system 16 through a weather hood 60. As will be appreciated, the weather hood 60 includes a series of slats 62 configured to deflect rain drops, sleet and/or snow away from the air intake system 16, thereby substantially reducing the moisture content of the incoming air 18. The air 18 then passes through the anti-icing system 12, which is disposed between the air inlet 56 and the filter 14 of the filter system 44. Further, the air flow 18 then passes through the filter system 44 (e.g., including the filter 14) that removes dirt and/or other debris which may otherwise enter the gas turbine system 10. The filter system 44 is disposed within the air intake system 16 downstream of the air inlet 56 and the anti-icing system 12.

As described above, the anti-icing system 12 includes a plurality of nozzles 42 each configured to emit jets 64 of the fluid 52. The anti-icing system 12 further includes the plurality of nozzle heads 46, and each nozzle head 50 of a plurality of nozzle heads 46 is configured to couple to a respective nozzle 48 of the plurality of nozzles 42 of the anti-icing system 12. Each nozzle head 46 is configured combine the jets 64 of fluid emitted from the nozzle 42 into a single jet 66 of fluid, and emit the single jet 66 of fluid to the air intake system 16 to keep ice from forming on the filter 14 of the filter system 44.

In some embodiments, the fluid 52 from each of the single jets 66 of fluid emitted from the plurality of nozzle heads 46 is configured mix with the air 18 entering the air intake system 16 from the air inlet 56. The fluid 52 emitted from the plurality of nozzles heads 46 may be air from compressor discharge air. As discussed above the compressor discharge air is hotter than the ambient temperature of the air intake system 16. Additionally, the compressor discharge air may be hotter than the air entering the air inlet 56, such that mixing the fluid 52 (e.g., compressor discharge air) with the air 18 from the air intake 56 increases the average air temperature of the air (e.g., a heated air 68) that flows from the anti-icing system 12 to the filter system 44. The heated air 68 may warm portions of the filter system 44.

The heated air 68 may flow directly downstream 58 of a respective nozzle head 50 where the mixing of the fluid 52 (e.g., compressor discharge air) and the air 18 from the air inlet 56 occurred. A flow rate of the heated air 68 may at least partially determine a total area of the filter system 44 warmed/heated by the heated air 68. For example, heated air 68 flowing at a high flow rate will have less time to spread causing the heated air 68 to have a higher temperature, but to heat a smaller total area of the filter system 44 than heated air 68 flowing at a slower flow rate. Additionally, a distance 70 between the respective nozzle head 50 and the filter system 44 may affect the total area of the filter system 44 warmed/heated by the heated air 68.

The plurality of nozzles 42 may be arranged to maximize the total area of the filter system 44 warmed by the heated air 68. The anti-icing system 12 has a plurality of fluid supply lines 72 configured to provide the fluid 52 (e.g., compressor discharge air) to the plurality of nozzles 42. The compressor discharge line 54 of FIG. 1 may provide the fluid 52 to the fluid supply lines 72. The fluid supply lines 72 may extend from a bottom 74 of the air intake system 16 to a top 76 of the air intake system 16. The fluid supply lines 72 may be arranged in a row along a length of the air intake, in a first direction 78, such that each of the fluid supply lines 72 are directly upstream/downstream of each other. In some embodiments, the fluid supply lines 72 are arranged in a row across a width of the air intake (not shown), in a second direction 80, such that the row across the width of the air intake is parallel to the filter system 44. In some embodiments, the anti-icing system 12 has fluid supply lines 72 arranged in a grid, such that the fluid supply lines 72 are arranged both in rows along the length of the air intake system 16 and in rows across the width of the air intake system 16. The fluid supply lines 72 may be arranged equal distance apart in their respective rows. Further, the plurality of nozzles 42 may be disposed in an array of grids 41. Each nozzle 48 of the plurality of nozzles 42 may be disposed equal distance apart along a height, in a third direction 82, of a respective fluid supply line 72. Arranging the plurality of fluid nozzles 42 as described above may minimize overlap of areas of the filter system 44 warmed by the heated air 68 each nozzle 48 of the plurality of nozzles 42. In some embodiments, a distance between the nozzles 42 is determined based at least in part on the locations of the nozzles 42, an air flow rate, and the distance 70 from the nozzles 42 to the filter system 44.

Although the plurality of nozzles 46 and their respective nozzle heads 50 may be disposed equal distance apart to minimize overlap and maximize the total area of the filter system 44 warmed by the heated air 68, there may still be gaps or cold portions of the air filter 44 between the heated portions of the filter system 44. The nozzle heads 50 are configured to increase effective heating of each of the plurality of nozzles 42 to reduce a total area of the cold portions of the air filter system.

Figure 3:
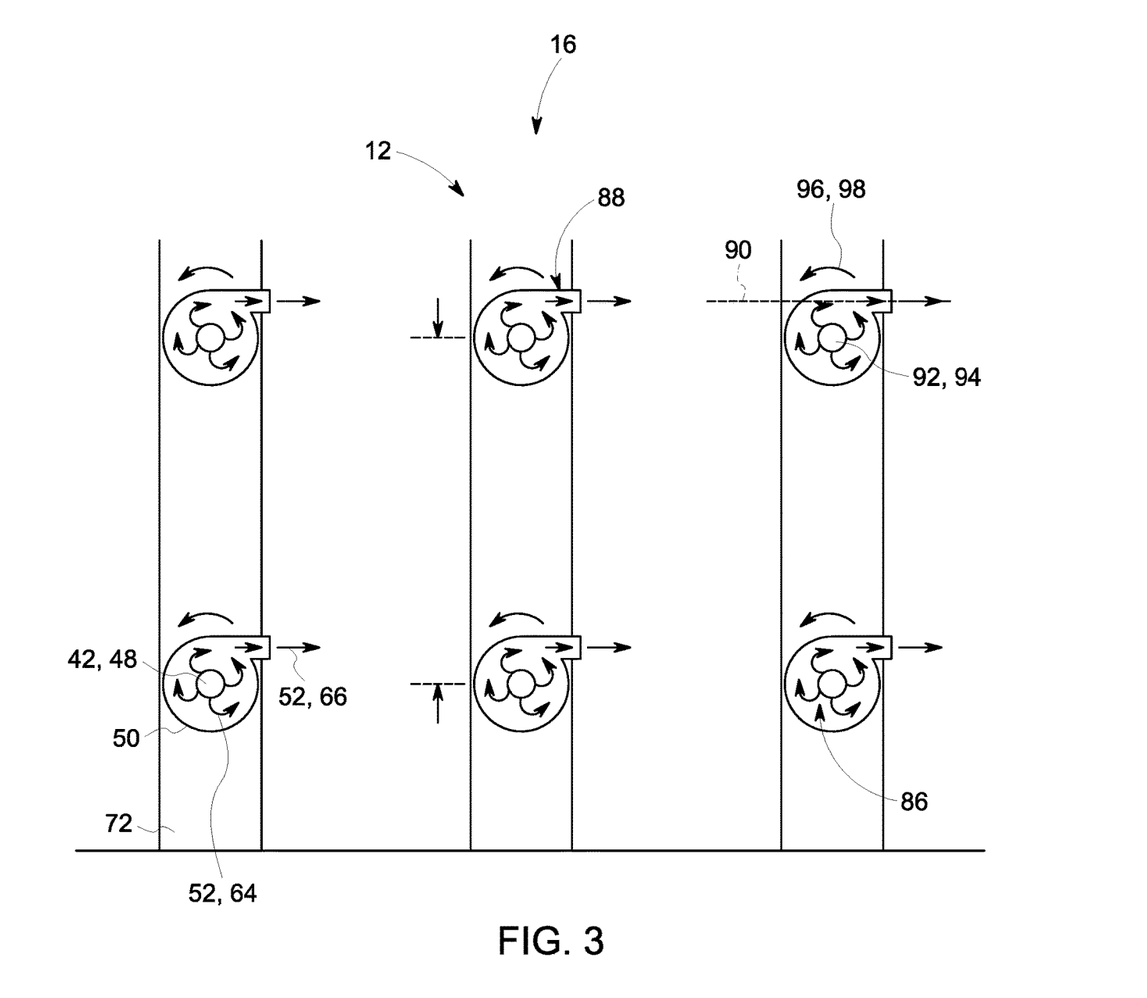
FIG. 3 is a front view of an embodiment of an anti-icing system disposed within the turbine air intake of FIG. 2.

FIG. 3 is a front view of an embodiment of the anti-icing system 12 disposed within the air intake system 16 of FIG. 2. The anti-icing system 12 includes the plurality of nozzles 42 coupled to the plurality of fluid supply lines 72. The plurality of nozzles 42 are arranged in a grid with each nozzle 48 of the plurality of nozzles 42 disposed equal distance apart to minimize overlap and reduce the total area of the cold portions of the filter system 44. A respective nozzle head 50 is coupled to each nozzle 48 of the plurality of nozzles 42. The fluid supply lines 72 are configured to provide the fluid 52 to each nozzle 48 of the plurality of nozzles 42. Each nozzle 48 is configured to emit the jets 64 of the fluid 52 via a plurality of orifices 86. The respective nozzle head 50 is configured to direct the jets 64 of fluid 52 emitted from the nozzle 48 through the plurality of orifices 86 toward at least one outlet of the nozzle head 50. In some embodiments, the at least one outlet is a single outlet 88 of the nozzle head 50. The nozzle head 50, having the single outlet 88, is configured combine the jets 64 of fluid 52 into a single jet 66 of fluid, and emit the single jet 66 of fluid 52 through the single outlet 88 to the air intake system 16. The at least one outlet does not include more than three outlets.

The nozzle head 50 is configured to rotate relative to the nozzle 48. The single jet 66 of fluid emitted from the nozzle head 50 is configured to drive rotation of the nozzle head 50. Specifically, an eccentric jet angular momentum of the single jet 66 is configured to drive rotation of the nozzle head 50. In some embodiments, the single outlet 88 of the nozzle head 50 may be positioned such that a central axis 90 of the single outlet of the nozzle head is substantially parallel to the air inlet 56 of FIG. 2 and/or the filter system 44 of FIG. 2. However, a rotational axis 92 of the nozzle 48 and nozzle head 50, which may be a central axis 94 of the nozzle 48 and the nozzle head 50, may be substantially perpendicular to the air inlet 56 and/or the filter system 44. The nozzle head 50 may be configured to rotate around the rotational axis 92; however, the nozzle 48 may be stationary with respect to the rotational axis 92. Moreover, the central axis 90 of the single outlet 88 may be offset from the rotational axis 92 such that the central axis 90 of the single outlet 88 of the nozzle head 50 does not pass through the rotational axis 92. The single jet 66 of fluid emitted from the single outlet 88 may generate a force on the nozzle head 50 in a direction along the central axis 90 of the single outlet 88, which is offset from the rotational axis 92, such that the force on the nozzle head 50 creates torque 96 on the nozzle head 50 that rotates the nozzle head 50, in a fourth direction 96, with respect to the nozzle 48. In some embodiments, the single outlet 88 of the nozzle head 50 is positioned in any suitable orientation configured to cause the nozzle head 50 to rotate with respect to the nozzle 48. The orientation of the single outlet 88 of the nozzle head 50 may be adjusted to control a trajectory of the single jet 66 of fluid 52 and/or an angular speed of the nozzle head 50.

Figure 4:
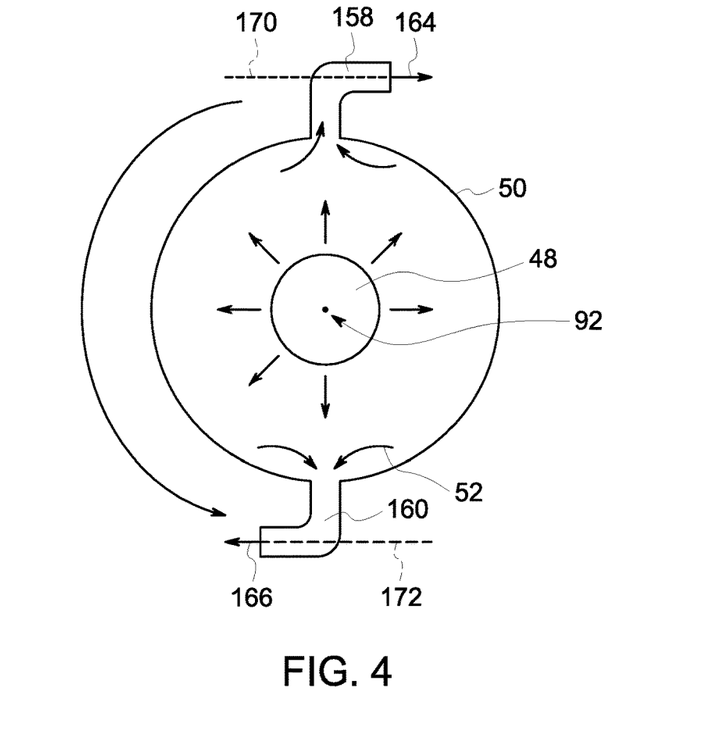
FIG. 4 is a front view of an embodiment of the anti-icing system having a nozzle head attached to a nozzle.

FIG. 4 is a front view of an embodiment of the anti-icing system having a nozzle head 50 attached to a nozzle 48. In the illustrated embodiment, the nozzle head includes two outlets (e.g., a first outlet 158 and a second outlet 160). The first outlet and the second outlet may be disposed one hundred and eighty degrees apart. As set forth above, a respective nozzle head 50 is coupled to each nozzle 48 of the plurality of nozzles. The fluid supply lines are configured to provide the fluid 52 to each nozzle 48 of the plurality of nozzles 42. Each nozzle 48 is configured to emit the jets of the fluid 52 via a plurality of orifices. In the illustrated embodiment, the respective nozzle head 50 is configured to direct the jets of fluid 52 emitted from the nozzle 48 through the plurality of orifices toward the first outlet 158 and the second outlet 160 of the nozzle head 50. The nozzle head 50 is configured combine the jets of fluid 52 into a first jet 164 of fluid and a second jet of fluid 166, and emit the first jet 164 of the fluid 52 through the first outlet 158 and the second jet 166 of fluid through the second outlet 160 to the air intake system.

The nozzle head 50 is configured to rotate relative to the nozzle 48. The first jet 164 of fluid and the second jet 166 of fluid emitted from the nozzle head 50 are configured to drive rotation of the nozzle head 50. Specifically, an eccentric jet angular momentum of the first jet 164 of fluid and the second jet 166 of fluid is configured to drive rotation of the nozzle head 50. In some embodiments, the first outlet 158 and second outlet 160 of the nozzle head 50 may be positioned such that a first central axis 170 of the first outlet and a second central axis 172 of the second outlet of the nozzle head are substantially parallel to the air inlet 56 of FIG. 2 and/or the filter system 44 of FIG. 2. However, a rotational axis 92 of the nozzle 48 and nozzle head 50, which may be a central axis 94 of the nozzle 48 and the nozzle head 50, may be substantially perpendicular to the air inlet and/or the filter system. The nozzle head 50 may be configured to rotate around the rotational axis 92; however, the nozzle 48 may be stationary with respect to the rotational axis 92. Moreover, the first central axis 170 of the first outlet 158 and the second central axis 172 of the second outlet 160 may be offset from the rotational axis 92 such that the first central axis 170 of the first outlet 158 and the second central axis 172 of the second outlet 160 of the nozzle head 50 do not pass through the rotational axis 92. The first jet 164 of fluid emitted from the first outlet 158 and the second jet of fluid 166 emitted from the second outlet 160 may generate a force on the nozzle head 50 in a direction along the first central axis 170 of the first outlet 158 and in a direction along the second central axis 172 of the second outlet 160, which is offset from the rotational axis 92, such that the force on the nozzle head 50 creates torque 96 on the nozzle head 50 that rotates the nozzle head 50, in a fourth direction 96, with respect to the nozzle 48. In some embodiments, the first outlet 158 and the second outlet 160 of the nozzle head 50 are positioned in any suitable orientation configured to cause the nozzle head 50 to rotate with respect to the nozzle 48. The orientation of the first outlet 158 and the second outlet 160 of the nozzle head 50 may be adjusted to control a trajectory of the first jet 164 of fluid and the second jet 166 of fluid and/or an angular speed of the nozzle head 50.

Figure 5:
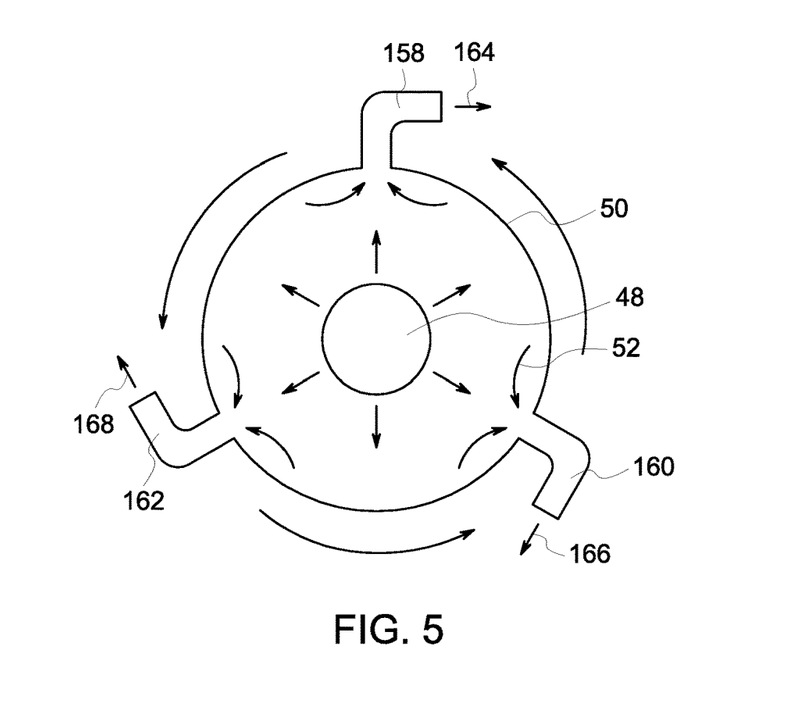
FIG. 5 is a front view of another embodiment of the anti-icing system having the nozzle head attached to the nozzle.

FIG. 5 is a front view of another embodiment of the anti-icing system having the nozzle head 50 attached to the nozzle 48. In the illustrated embodiment, the nozzle head includes three outlets (e.g., the first outlet 158, the second outlet 160, and a third outlet 162). Each of the first outlet 158, the second outlet 160, and the third outlet 162 may be disposed one hundred and twenty degrees apart. As set forth above, a respective nozzle head 50 is coupled to each nozzle 48 of the plurality of nozzles. The fluid supply lines are configured to provide the fluid 52 to each nozzle 48 of the plurality of nozzles 42. Each nozzle 48 is configured to emit the jets of the fluid 52 via a plurality of orifices 86. In the illustrated embodiment, the respective nozzle head 50 is configured to direct the jets of fluid 52 emitted from the nozzle 48 through the plurality of orifices 86 toward the first outlet 158, the second outlet 160, and the third outlet 162 of the nozzle head 50. The nozzle head 50 is configured combine the jets of fluid 52 into the first jet 164 of fluid, the second jet of fluid 166, and a third jet 168 of fluid, and emit the first jet 164 of the fluid 52 through the first outlet 158, the second jet 166 of fluid through the second outlet 160, and the third jet 168 of fluid through the third outlet 162 to the air intake system.

Figure 6:
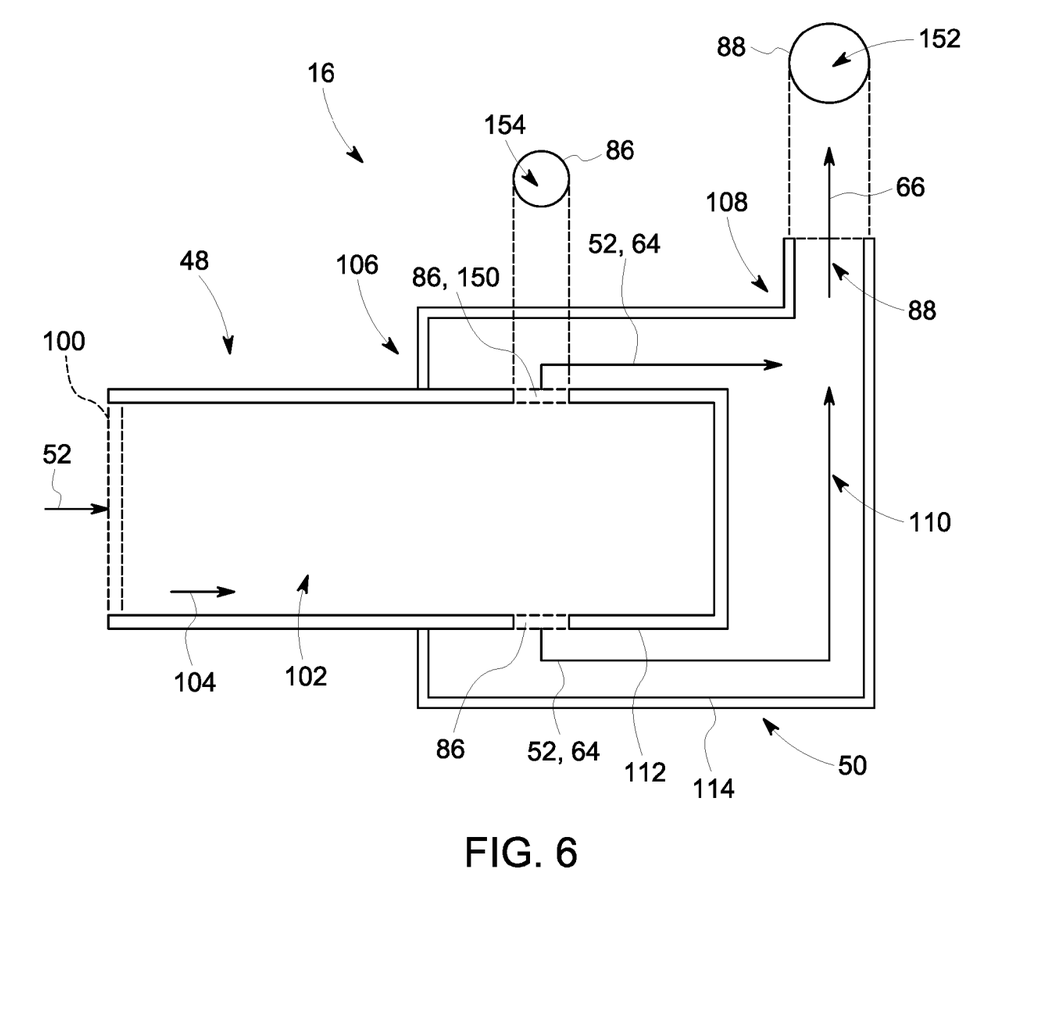
FIG. 6 is a cross-sectional view of another embodiment of the anti-icing system having the nozzle head attached to the nozzle.

FIG. 6 is a cross-sectional view of an embodiment of the nozzle head 50 coupled to the nozzle 48. As described above, the fluid supply line 72 of FIG. 3 provides the fluid 52 to the nozzle 48, which is coupled to the fluid supply line 72. The fluid 52 enters the nozzle 48 via a nozzle inlet 100 of the nozzle 48, and passes through a hollow portion 102 of the nozzle 48 in a direction toward the plurality of orifices 86 of the nozzle 48. The plurality of orifices 86 of the nozzle 48 are each configured to discharge the jet 64 of the fluid 52 from the nozzle 48.

The nozzle head 50 is coupled to the nozzle 48 such that the nozzle head 50 is disposed over the plurality of orifices 86. The nozzle head 50 includes a stationary portion 106 and rotating portion 108. The stationary portion 106 of the nozzle head 50 is coupled to the nozzle 48, and the rotating portion 50 is rotationally coupled to the stationary portion 106, such that the rotating portion 108 is configured to rotate with respect to the stationary portion 106. The stationary portion 106 and the rotating portion 108 together enclose the plurality of orifices 86. Coupling the nozzle head 50 to the nozzle 48 forms a nozzle head chamber 110 between an exterior 112 of the nozzle and an interior 114 of the nozzle head 50. The jets 64 of fluid 52 emitted from the nozzle 48, via the plurality of orifices 86, flow into the nozzle head chamber 110. In the illustrated embodiment, the jets 64 of fluid 52 then flow in a direction toward the single outlet 88 of the nozzle head 50. The nozzle head 50 is configured to combine the jets 64 of fluid and emit the single jet 66 of fluid 52 into the air intake system 16 via the single outlet 88. In some embodiments, the jets 64 of fluid may flow toward the first outlet 158, the second outlet 160, and/or the third outlet 162.

Figure 8:
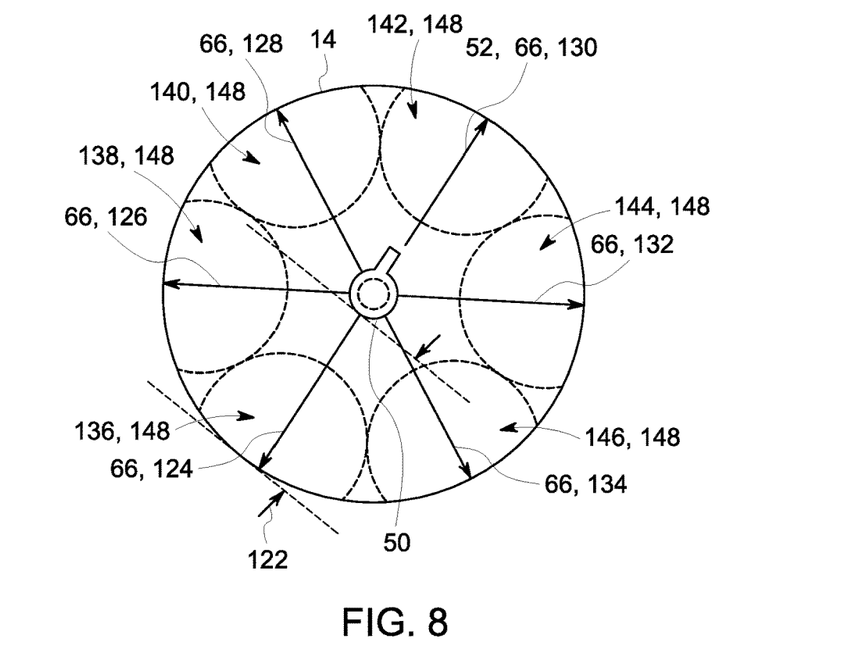
FIG. 8 is a temperature diagram of another embodiment the filter of the anti-icing system, wherein the anti-icing system is emitting fluid from the nozzle head to heat a portion of the filter.

The single outlet 88 has a cross-sectional area 152. Each orifice 150 of the plurality of orifices 86 has a respective cross-sectional area 154. The single outlet cross-sectional area 152 of the single outlet 88 is less than the total cross-sectional area of the respective cross-sectional areas 154 of the plurality of orifices 86. In some embodiments, the total cross-sectional area of the first outlet 158, the second outlet 160, and/or the third outlet 162 is less than the total cross-sectional area of the respective cross-sectional areas 154 of the plurality of orifices 86. In some embodiments, the cross-sectional area 152 of the single outlet 88 is between ten and ninety percent of the total cross-sectional area of the respective cross-sectional areas 154 of the plurality of orifices 86. In another embodiment, the cross-sectional area 152 of the single outlet 88 is between forty and eighty percent of the total cross-sectional area of the respective cross-sectional areas 154 of the plurality of orifices 86. An amount of fluid flowing through a smaller cross-sectional area has a greater velocity than the same amount of fluid flowing through a larger cross-sectional area. Thus, the velocity of the single jet 66 of fluid emitted from the single outlet 88 may be greater than the velocity of the jets 64 of fluid flowing through each orifice of the plurality of orifices 86 of the nozzle 48. Increasing the velocity of a fluid jet emitted into the air intake system 16 may increase a range of the fluid jet emitted into the air intake system 16 (i.e., from the nozzle). Thus, coupling the nozzle head 50 to the nozzle 48 may increase the range or the distance of the fluid jet because the single jet 66 of fluid will have a higher velocity than the jets 64 of fluid. Increasing the distance of the fluid jet emitted into the air intake system 16 may increase the total area of the air filter system that may be warmed by the heated air 68 from the nozzle 48.

FIG. 7 is a temperature diagram of an embodiment the filter 14 of the anti-icing system 12, wherein the anti-icing system 12 is emitting the fluid 52 from the nozzle 48 to heat a portion of the air filter system (e.g., the filter 14) without a nozzle head 50. As described above, the nozzle 48 has a plurality of orifices 86 configured to emit the jets 64 of fluid 52. Without the nozzle head 50 coupled to the nozzle 48, the nozzle emits the jets 64 of fluid 52 directly into the air intake system 16 to warm the portion of the air filter system. Each orifice 150 of the plurality of orifices 86 is configured to emit a respective jet 64 of fluid 52 a first distance 116 from the nozzle. The first distance 116 may be between one to six times the diameter 118 of the nozzle 48. In some embodiments, the first distance 116 is between one to four times the diameter 118 of the nozzle 48. Thus, in some embodiments, the first distance 116 is less than four times the diameter 188 of the nozzle. Together, the jets 64 of fluid 52 emitted from the nozzle 48 through each orifice of the plurality of orifices 86 is configured to heat a first cross-sectional area of the filter 14 of the filter system 44. The first cross-sectional area 120 of the filter system 44 may have a substantially circular profile. Additionally, the first cross-sectional area 120 may have a highest temperature proximate a center of the first cross-sectional area 120, and the temperature of the first cross-sectional area 120 may decrease moving away from the center of the first cross-sectional area 120. The temperature of any portion of the first cross-sectional area 120 may be sufficiently high to reduce, eliminate, or block ice buildup on the filter 14 of the filter system 44.

FIG. 8 is a temperature diagram of another embodiment the filter 14 of the anti-icing system 12, wherein the anti-icing system 12 is emitting the single jet 66 of fluid from the nozzle head 50, coupled to the nozzle 48, to heat the portion of the air filter system 44 (e.g., the filter 14). In the illustrated embodiment, the nozzle head 50 has a single outlet 88 that is configured to emit the single jet 66 of fluid a second distance 122 from the nozzle head 50. The second distance 122 may be between six to twenty times the diameter 118 of the nozzle 48. In some embodiments, the second distance 122 may be between ten to fourteen times the diameter 118 of the nozzle 48. Thus, in some embodiments, the second distance is at least ten times the diameter of the nozzle. The second distance 122 is greater than the first distance 116 such that the nozzle head 50 is configured to emit the fluid 52 a greater distance than the nozzle 48.

The nozzle head 50 is configured to emit the single jet 66 of fluid in a single direction. However, the nozzle head 50 is configured to rotate to increase the total area heated by the fluid emitted from the nozzle head 50. For example, at a first time, the nozzle head 50 is configured to emit the single jet 66 of fluid in a first angular direction 124 to heat a first portion 136 of the filter. The nozzle head 50 is configured to rotate such that at a second time, the nozzle head 50 is configured to emit the single jet of fluid in a second angular direction 126 to heat a second portion 138 of the filter. In the present embodiment, the nozzle head 50 is shown to rotate to the first 124, the second 126, a third 128, a fourth 130, a fifth 132, and a sixth 134 angular direction to heat the first 136, the second 138, a third 140, a fourth 142, a fifth 144, and a sixth 146 portion of the filter 14 at the respective first, second, third, fourth, fifth, and sixth times.

Figure 7:
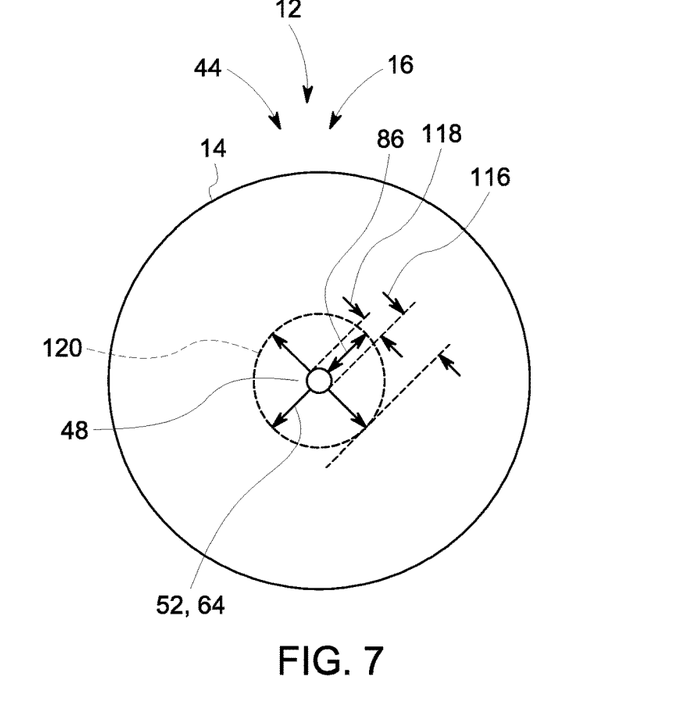
FIG. 7 is a temperature diagram of an embodiment the filter of the anti-icing system, wherein the anti-icing system is emitting fluid from the nozzle to heat a portion of the filter.

The fluid emitted from the nozzle head 50 through the single outlet 88 is configured to warm a second cross-sectional area 148 of the filter 14 of the filter system 44. The second cross-sectional area 148 heated by the nozzle head 50 includes the first 136, the second 138, the third 140, the fourth 142, the fifth 144, and the sixth 146 portions of the filter 14. The second cross-sectional area 148 is greater than the first-cross sectional area 120. Accordingly, the nozzle head 50 is configured to heat a larger portion of the filter 14 of the filter system 44 than the nozzle 48.

The temperature of any portion of the second cross-sectional area 148 may be sufficiently high to reduce, eliminate, or block ice buildup on the filter system 44. In some embodiments, the heated air 68 from the anti-icing system 12 is configured to heat the filter 14 to a temperature between zero and ten degrees Celsius (thirty-two and fifty degrees Fahrenheit). In another embodiment, the heated air 68 from is configured to heat the filter 14 to a temperature between two and nine degrees Celsius (about thirty-six and forty-eight degrees Fahrenheit). In a further embodiment, the heated air 68 from is configured to heat the filter 14 to a temperature between four and eight degrees Celsius (about thirty-nine and forty-six degrees Fahrenheit).

The technical effects of the anti-icing techniques disclosed herein include providing more effective removal, reduction, and/or blocking of ice buildup on the filter system of the gas turbine system than traditional systems using a cost-effective nozzle head configured to interface with pre-existing anti-icing systems. The nozzle head is configured to increase an area of the filter of the filter system heated by the fluid from the nozzle by combining the jets of fluid from the nozzle into the single jet of fluid that has a greater range than the jets of fluid individually. Further, the nozzle head rotates with respect to the nozzle causing the single jet of fluid to rotate; thereby, causing the single jet of fluid to heat a larger cross-sectional area of the filter than jets of fluid from the nozzle. Additionally, rotating the nozzle head having a single jet causes the area of the filter system heated by the fluid to have a more uniform temperature across the area of the filter system. Therefore, the anti-icing techniques disclosed herein increase a total cross-sectional area of the filter system heated to provide more effective removal, reduction, and/or blocking of ice buildup on the filter system, without costly installation of additional or different nozzles, which may allow the system to operate without ice build-up at lower air temperatures than traditional systems.

This written description uses examples to disclose the embodiments of the present disclosure, including the best mode, and also to enable any person skilled in the art to practice the embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An anti-icing system for a gas turbine system, comprising:
a plurality of nozzles arranged in a grid and configured to inject fluid within an air intake system of the gas turbine system upstream of a filter to keep ice from forming on the filter, wherein each nozzle of the plurality of nozzles comprises a first wall having a plurality of orifices for injecting jets of fluid from the nozzle; and
a nozzle head coupled to a nozzle of the plurality of nozzles, the nozzle head having a second wall, wherein the second wall of the nozzle head is radially disposed over the first wall having the plurality of orifices to enclose the plurality of orifices within the first wall, the nozzle head is configured to rotate relative to the nozzle of the plurality of nozzles, and the nozzle head comprises at least one outlet configured to combine the jets of fluid into at least one jet that exits the at least one outlet.

2. The anti-icing system of claim 1, wherein an eccentric jet angular momentum of the at least one jet is configured to drive rotation of the nozzle head.

3. The anti-icing system of claim 1, comprising a plurality of nozzle heads, wherein a respective nozzle head of the plurality of nozzle heads is disposed over a respective nozzle of the plurality of nozzles, and each respective nozzle head of the plurality nozzle heads is configured to combine the jets of fluid injected from the respective nozzle into the at least one jet that exits the at least one outlet.

4. The anti-icing system of claim 3, wherein the plurality of nozzles is configured to inject the fluid over a first cross-sectional area of the filter, the plurality of nozzle heads is configured to inject the fluid over a second cross-sectional area of the filter, and the second cross-sectional area is greater than the first cross-sectional area.

5. The anti-icing system of claim 1, wherein a cross-sectional area of the at least one outlet is less than total cross-sectional area of respective cross-sectional areas of the plurality of orifices.

6. The anti-icing system of claim 5, wherein the cross-sectional area of the at least one outlet is at least 20 percent less than the total cross-sectional area of the plurality of orifices.

7. The anti-icing system of claim 1, wherein each nozzle comprises a diameter, each orifice of the plurality of orifices is configured to direct a respective jet a first distance from each nozzle, the at least one outlet is configured to direct the at least one jet a second distance from the nozzle head, and the second distance is greater than the first distance.

8. The anti-icing system of claim 7, wherein the first distance is no more than four times the diameter, and the second distance is at least ten times the diameter.

9. The anti-icing system of claim 1, wherein the nozzle head comprises a stationary portion and a rotating portion, and the stationary portion is coupled to the nozzle.

10. The anti-icing system of claim 1, wherein the fluid comprises compressor discharge air from a compressor of the gas turbine system.

11. A gas turbine system, comprising:
a turbine;
a combustor; and
a compressor having an air intake, wherein the air intake is configured to supply an air flow to the compressor, and the air intake comprises a filter system and an anti-icing system, wherein the anti-icing system comprises:
 a nozzle comprising a first wall having a plurality of orifices for directing jets of fluid from the nozzle; and
 a nozzle head coupled to the nozzle, the nozzle head having a second wall, wherein the second wall of the nozzle head is radially disposed over the first wall having the plurality of orifices to enclose the plurality of orifices within the first wall, the nozzle head is configured to rotate relative to the nozzle, and the nozzle head comprises at least one outlet and is configured to combine the jets of fluid into at least one jet that exits the at least one outlet into the air intake upstream of the filter system to keep ice from forming on the filter system.

12. The gas turbine system of claim 11, wherein the fluid comprises compressor discharge air from the compressor of the gas turbine system.

13. The gas turbine system of claim 11, comprising a plurality of nozzles and a plurality of nozzle heads, each nozzle of the plurality of nozzles comprising the first wall having the plurality of orifices for directing jets of fluid from the respective nozzle, and the plurality of nozzles is arranged in a grid, wherein a respective nozzle head of the plurality of nozzle heads is coupled to a respective nozzle of the plurality of nozzles, and each respective nozzle head of the plurality nozzle heads is configured to combine the jets of the fluid directed from the respective nozzle into the at least one jet that exits the at least one outlet.

14. The gas turbine system of claim 13, wherein the plurality of nozzles is configured to direct the fluid over a first cross-sectional area of the filter system, the plurality of nozzle heads is configured to direct the fluid over a second cross-sectional area of the filter system, and the second cross-sectional area is greater than the first cross-sectional area.

15. The gas turbine system of claim 11, wherein a cross-sectional area of the at least one outlet is less than a total cross-sectional area of respective cross-sectional areas of the plurality of orifices.

16. The gas turbine system of claim 15, wherein the cross-sectional area of the at least one outlet is at least 20 percent less than the total cross-sectional area of respective cross-sectional areas of the plurality of orifices.

17. The gas turbine system 11, wherein the nozzle head comprises a stationary portion coupled to the nozzle and a rotating portion, and an eccentric jet angular momentum of the at least one jet is configured to drive rotation of the rotating portion relative to the stationary portion.

18. A nozzle head for an anti-icing system, comprising:
a stationary portion configured to couple to a nozzle, wherein the nozzle comprises a first wall having a plurality of orifices for directing jets of fluid into an air intake system of a gas turbine system; and
a rotating portion coupled to the stationary portion, wherein the stationary portion and the rotating portion comprises a second wall, wherein the stationary portion and the rotating portion together enclose the plurality of orifices within the second wall, the second wall being radially disposed about the first wall having the plurality of orifices, the rotating portion comprises a single outlet configured to combine the jets of fluid into a single jet of fluid that exits into the air intake system, and an eccentric jet angular momentum of the single jet of fluid is configured to drive rotation of the rotating portion relative to the stationary portion.

19. The nozzle head of claim 18, wherein the nozzle comprises a diameter, each orifice of the plurality of orifices is configured to direct a respective jet a first distance from the nozzle, the single outlet is configured to direct the single jet a second distance from the nozzle head, and the second distance is greater than the first distance.

20. The nozzle head of claim 18, wherein the first distance is no more than four times the diameter, and the second distance is at least ten times the diameter.

* * * * *